United States Patent
Matsumoto

(10) Patent No.: US 6,216,673 B1
(45) Date of Patent: Apr. 17, 2001

(54) SOLENOID VALVE INCORPORATING A CHAMBER

(75) Inventor: Tatsuya Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/290,182

(22) Filed: Apr. 13, 1999

(30) Foreign Application Priority Data

Dec. 3, 1998 (JP) .................................................. 10-344516

(51) Int. Cl.$^7$ ................................................... F02M 33/04
(52) U.S. Cl. .............................................. 123/520; 251/48
(58) Field of Search .................................. 123/516, 518, 123/519, 520; 251/129.15, 48, 53

(56) References Cited

U.S. PATENT DOCUMENTS

| | | | |
|---|---|---|---|
| 4,641,686 | * 2/1987 | DeLand et al. | 251/129.15 |
| 5,601,275 | * 2/1997 | Hironaka | 251/48 |
| 5,803,056 | * 9/1998 | Cook et al. | 123/520 |
| 5,893,354 | * 4/1999 | Detweiler et al. | 123/520 |
| 5,921,261 | * 7/1999 | Erickson et al. | 251/48 |
| 5,941,267 | * 8/1999 | DeLand et al. | 251/53 |
| 5,970,958 | * 10/1999 | DeLand et al. | 123/520 |

FOREIGN PATENT DOCUMENTS

| | | |
|---|---|---|
| 33 11 268 C1 | 9/1984 | (DE) . |
| 38 20 842 A1 | 12/1989 | (DE) . |
| 43 44 440 A1 | 6/1995 | (DE) . |

\* cited by examiner

*Primary Examiner*—Thomas N. Moulis
(74) *Attorney, Agent, or Firm*—Sughrue, Mion, Zinn, Macpeak & Seas, PLLC

(57) ABSTRACT

An apparatus for suppressing the purge of the evaporated fuel gas in the prior art has a chamber in the middle of the piping connecting between the input port and an external apparatus, for reducing the pulsation of fluid flow, for reducing the noise sound and mechanical vibration. The reduction effect can not be attained, when the chamber is not disposed at an antinode of vibration. And it is difficult to dispose the chamber just at such antinode. And such arrangement is not advantageous in layout designing and from point of view of fabrication cost.

The problem is solved by a solenoid valve according to the present invention. The solenoid valve comprises an input port, to which a pressure is imposed, an output port to be connected with an external apparatus, a plunger for opening and closing a channel communicating the input port and the output port according to the current supplied to a coil for driving the plunger, wherein a chamber is disposed in the middle of the channel from the input port to the output port.

7 Claims, 8 Drawing Sheets

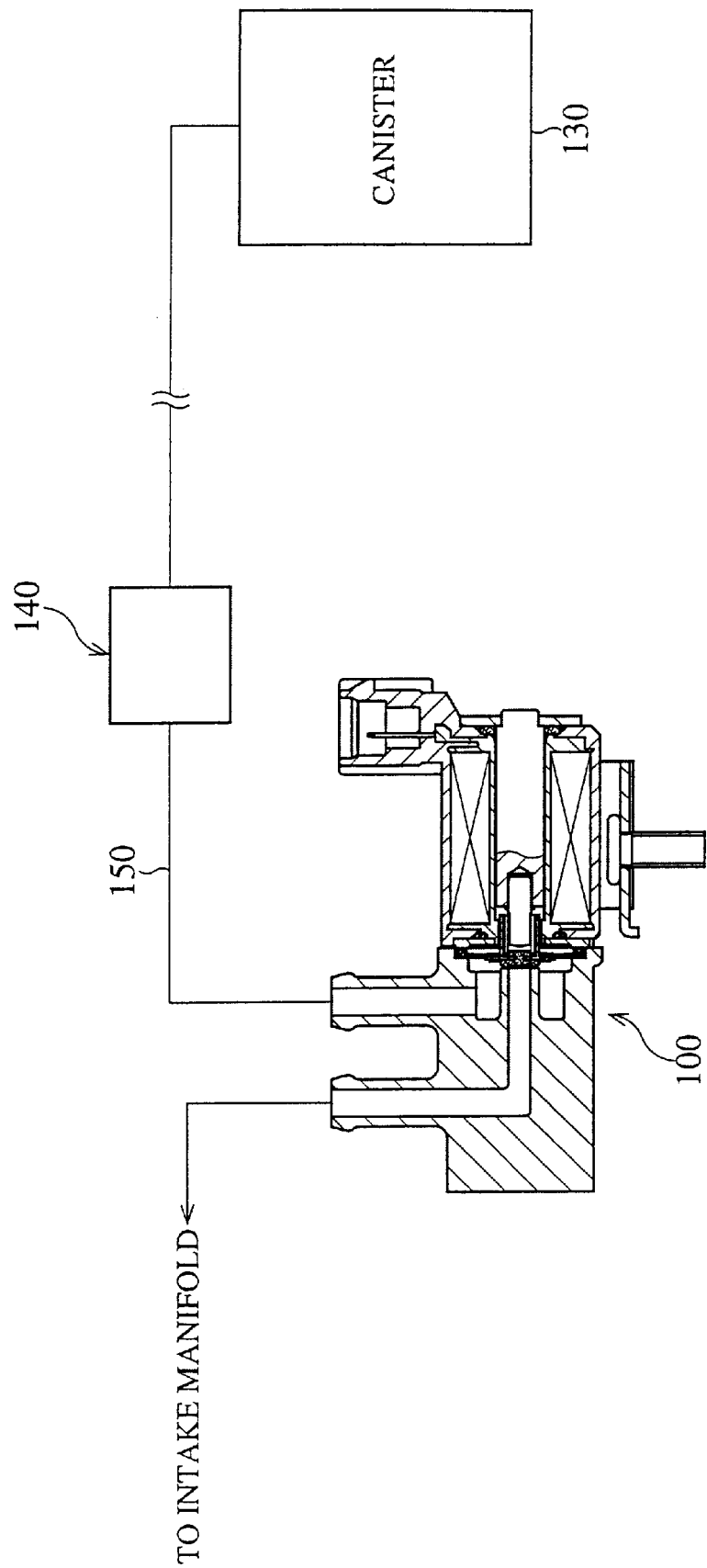

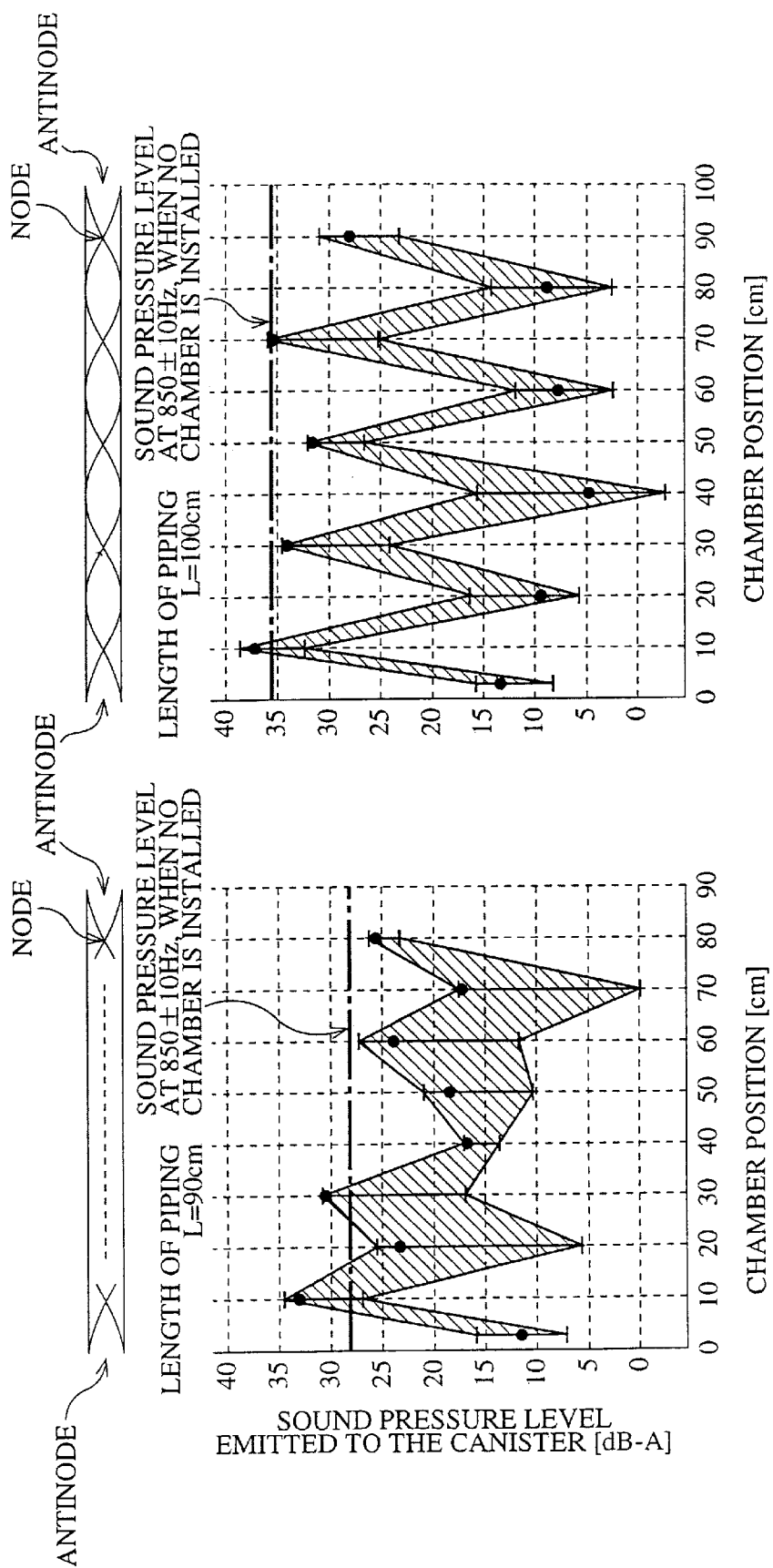

SOLENOID VALVE INCORPORATING A CHAMBER

BACKGROUND OF THE INVENTION

1. Field of the Invention

The present invention relates to a solenoid valve incorporating a chamber.

2. Description of the Prior Art

FIG. 6 shows a longitudinal sectional view of a solenoid valve in the prior art. Reference numeral 101 denotes a housing made from synthetic resin, having an output port 102 and an input port 103. A negative pressure is to be imposed to the output port. The phrase "negative pressure" in this specification and Claims means "pressure lower than the atmospheric pressure". Reference numeral 104 is a cover made from synthetic resin, in which a coil 105 is installed. A magnetic plate 106 (made from iron) is disposed between the housing 101 and the cover 104 to form a magnetic path together with a core 107. A magnetic yoke 108 (made from iron) forms a magnetic path together with the plate 106. The yoke 108 has a substantially U form.

A connector 110 for supplying electric power to the coil 105 has a hole 109, into which an external socket (not shown) shall be inserted. A first channel 111 disposed in the housing 101 communicates with the output port 102. The output port 102 functions as a negative pressure imposing port. A second channel 112 disposed in the housing 101 communicates with the input port 103.

The core 107 has a coaxial pin 113, which is disposed so that a part thereof projects from one end of the core. A plunger 114 is set on the pin 113. A valve element 115 is disposed at one end of the plunger 114. A spring 116 is disposed between the core 107 and plunger 114, which urges the valve element 115 towards a face of the housing 101 to close the first channel 111. A plate spring 117 is disposed on the plunger 114, which has a sealing element 118 at its peripheral portion. The solenoid valve has a seat 119, for fixing the solenoid valve to a fixing portion (not shown) of an external apparatus. Reference numeral 20 denotes a bolt for fixing the solenoid valve to the fixing portion.

The operation of this conventional solenoid valve is described below.

When electric power is not supplied to the coil 105 from the external power source, the valve element 115 of the plunger 114 is urged by the resilient force of the spring 116 towards a face of the housing 101, so as to close the communicating portion between the first and second channel 111, 112. As a result, the communicating channel between the output port 102 and the input port 103 is closed.

Starting from this state, when electric current is supplied through the coil 105, a magnetic field is induced to move the plunger 114, resisting against the resilient force of the spring 116, to separate the valve element 115 from the face of the housing 101. As a negative pressure is imposed at the output port 102, the fluid supplied into the input port 103 is released from the output port 102, after passing though the first and second channels 111, 112.

In general, electric current is intermittently supplied to the coil 105 so as to control to open and close intermittently the communicating portion between the first and second channel 111, 112. At each opening and closing of the channels, an operation sound is caused by the movement of the solenoid valve, and a flow sound is caused by the opening and closing of the channels. And they propagate to an external apparatus connected with the input port 103. Sound, having a frequency equal to the eigenfrequency of the external apparatus resonates in the apparatus, and a troublesome resonating sound is generated.

In the case when the length of the piping connecting between the input port 103 and the external apparatus (not shown) is an even number multiplied by one quarter of the wave length of the eigenfrequency, this frequency component of the sound resonates in the piping. Namely the sound is amplified in the piping, therefore the resonating sound in the external apparatus further increases.

Moreover, the intermittent opening and closing of communicating part between the first and second channels 111, 112 causes a pulsation of the fluid flow from the second channel 112. The energy of this pulsation causes a mechanical vibration of the piping connecting the input port 103 and an external apparatus. The vibration propagates to an external apparatus through the piping and/or a portion of the solenoid valve contacting with the external apparatus. This phenomena is troublesome.

For eliminating this trouble, the solenoid valve in the prior art has a chamber in the middle of the piping. FIG. 7 shows a schematic diagram of an apparatus for suppressing the purge of the evaporated fuel gas in the prior art. The apparatus for suppressing the purge of the evaporated fuel gas comprises a canister 130. And a chamber 140 is disposed in the middle of the piping 150 connecting the solenoid valve 100 and the canister 130.

The function of the apparatus for suppressing the purge of the evaporated fuel gas in the prior art is explained below.

When the engine starts to rotate, a negative pressure appears in the intake manifold of the engine. Therefore, when the solenoid valve 100 is opened, evaporated gas from the canister 130 is supplied to the intake manifold, after passing through the chamber 140 and the solenoid valve 100.

If the supply amount of the purge gas is not appropriate, it causes bad influences to the function of the engine. Thus the solenoid valve 100 is controlled by a control signal from a controller (not shown) so as to be intermittently opened and closed, namely the duty ratio of the opening and closing of the solenoid valve is controlled. This intermittent opening and closing generates an operation sound and a flow sound. The sounds are damped by the chamber 140 for preventing the propagation to the canister 130, so that a generation of resonating sound in the canister 130 is eliminated. Simultaneously, the pulsation of flow in the piping is damped by the chamber 140, so that the vibration of the piping and the canister caused by the pulsation is eliminated.

FIG. 8 is a characteristic curve of sound emission versus the position of the chamber. FIG. (*a*) corresponds to the case that no frequency component in the propagating sound resonates in the piping, on the other hand, (*b*) corresponds to the case that a frequency component equal to the eigenfrequency of the canister resonates in the piping.

FIG. 9 shows a characteristic curve of resonating vibration of the canister versus the position of the chamber. FIG. (*a*) corresponds to the case that no frequency component in the propagating sound resonates in the piping, on the other hand, (*b*) corresponds to the case that a frequency component equal to the eigenfrequency of the canister resonates in the piping.

The canister used in the evaluation shown in FIGS. 8 and 9 had an eigenfrequency of 850 Hz, which corresponds to a wave length of 40 cm. FIGS. 8 and 9 show that a resonance appears when the piping length is an even number multiplied by a quarter of wave length (10 cm).

These figure show that a pulsation suppressing effect is small when the chamber 140 is arranged at an antinode of the vibration in the piping, and the effect appears when the chamber 140 is arranged at a node of the oscillation. Antinodes and nodes of the oscillation in the piping are schematically shown at the upper portion of the FIGS. 8(a), (b). It shall be noted that when both the ends of the piping, which is connected with the input port 103, are opened, both the ends are antinodes for all the frequency components, irrespective of the resonance.

SUMMARY OF THE INVENTION

As explained, the solenoid valve in the prior art has a drawback that a mechanical sound and a fluid flow sound are generated at every opening and closing of the fluid channel. When these sounds propagate to an external apparatus, a frequency component identical with the eigenfrequency of the external apparatus resonates. This, in turn, makes a troublesome resonating sound. Additionally, depending upon the piping length between the solenoid valve and the external apparatus, the propagated sound resonates in the piping. When a resonance appears, the sound propagates to the external apparatus, after amplified by the resonance. In such a case, the resonating sound further increases.

Moreover, a pulsation of fluid flow appears at every opening and closing of the fluid channel. A mechanical vibration of the piping connecting the solenoid valve and the external apparatus is caused by the energy of the pulsation. This vibration may cause trouble.

When the solenoid valve in the prior art is used, a chamber is arranged in the piping connecting the input port and the external apparatus, for eliminating the sound resonance in the piping. For effectively suppressing the sound resonance at the eigenfrequency of the external apparatus, the chamber shall be arranged at an antinode of the vibration of the propagating sound in the piping. If it is not positioned at an antinode of the vibration, the suppressing effect of such arrangement is small. Another problem is that it is difficult to arrange the chamber just at the antinode of the vibration. Moreover, it is not advantageous in the layout designing of the solenoid valve and from a point of view of fabrication cost, to arrange the chamber in the middle of the piping, as is in the prior art.

An object of the present invention is to solve the drawbacks of the solenoid valve in the prior art.

Another object of the present invention is to propose a solenoid valve, which allows to decrease the emission of sound, without arranging a chamber in the middle of the piping for reducing the sound resonance in the canister.

Another object of the present invention is to propose a solenoid valve, which will allow the reduction of the pulsation of fluid flow, which may be caused by the opening the closing of the flow channel, so as to reduce the sound vibration in the piping and in the canister.

A further object of the present invention is to propose an apparatus, using a solenoid valve according to the present invention, for suppressing the purge of the evaporated fuel gas, which can reduce the sound resonance and mechanical vibration in the canister.

The object of the present invention is attained by the solenoid valve comprising an output port, to which a pressure is imposed, an input port connected to an external apparatus, and a plunger for opening and closing the flow channel between the input port and output port wherein a chamber is arranged in the middle of the flow channel between the input port and the output port.

An apparatus for suppressing the purge of the evaporated fuel gas according to the present invention comprises a solenoid valve for controlling the quantity of the purge gas to be supplied to the intake pipe from the canister which stores temporally the purge gas from the fuel tank, wherein the solenoid valve is comprises of an output port, to which a pressure of the intake manifold is imposed, an input port to be connected to a canister, a plunger for opening and closing the channel communicating the input port and the output port, and a chamber arranged at a position in the middle of the channel from the input port to the output port.

BRIEF DESCRIPTION OF THE DRAWINGS

FIG. 7 shows a schematic diagram of an apparatus for suppressing the purge of the evaporated fuel gas in the prior art.

FIG. 8 is a characteristic of sound emission versus the position of the chamber. FIG. (a) corresponds to the case that there is no resonance, (b) corresponds to the case that there is a resonance.

DETAILED DESCRIPTION OF THE PREFERRED EMBODIMENTS

Preferred embodiments are explained below.

Embodiment 1

Figure 1:
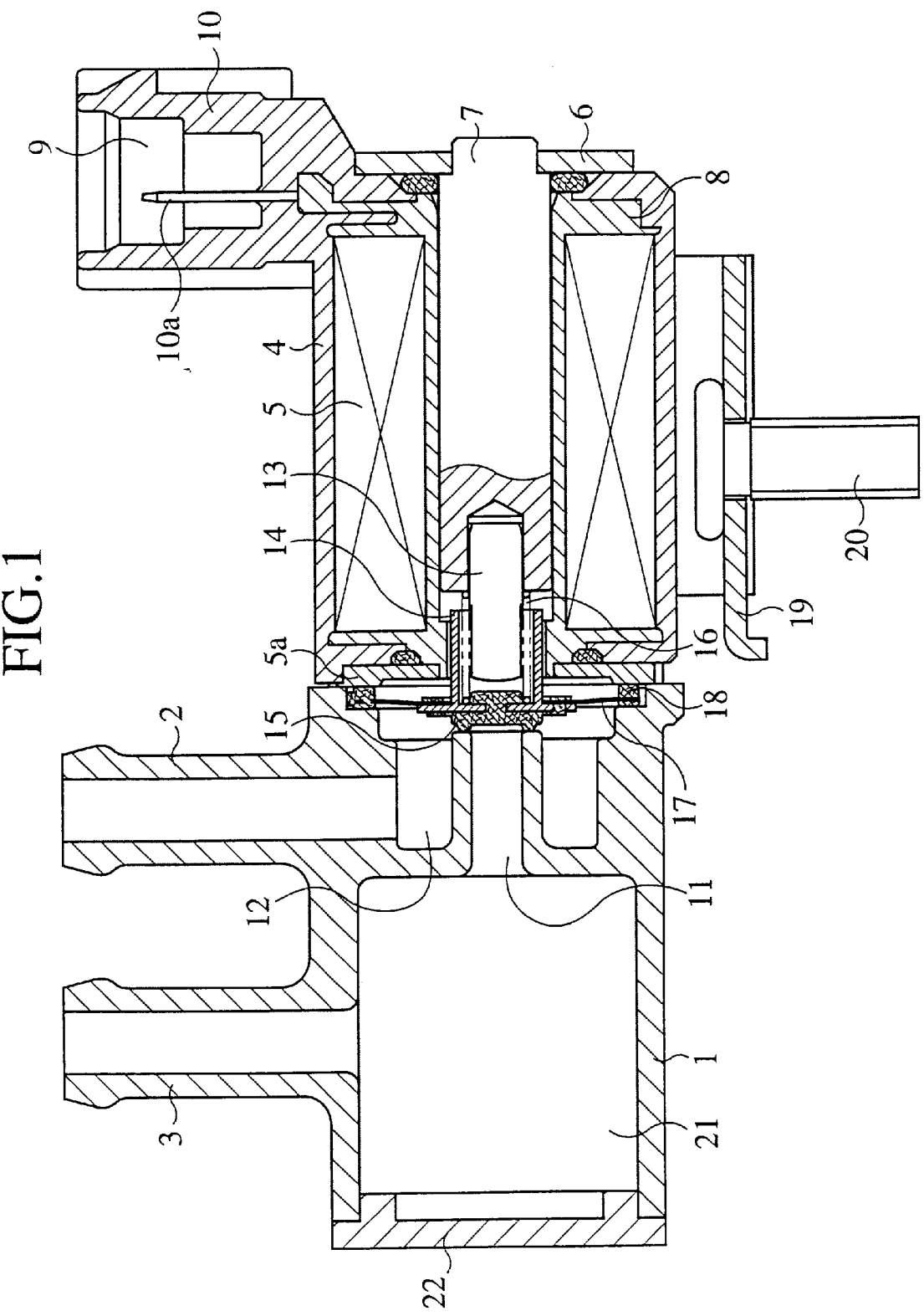
FIG. 1 shows a longitudinal cross section of a solenoid valve according to the present invention.

FIG. 1 shows a longitudinal cross section of a solenoid valve according to the first embodiment of the present invention. Reference numeral 1 denotes a housing made from a synthetic resin, in which an output port 2 and an input port 3 are arranged. Negative pressure is imposed to the output port 2. Reference numeral 4 is a cover made from synthetic resin, in which a coil 5 is installed. A magnetic (iron) plate 5a is arranged between the housing 1 and the cover 4. The plate 5a forms a magnetic path together with a yoke 6 and a core 7. Reference numeral 8 denotes a substantially U-formed magnetic (iron) yoke, which forms a magnetic path together with the plate 5a.

The input port and the output port of the solenoid valve of the prior art are so arranged that the valve element is pushed by the negative pressure to tighten the closing, when the valve is closed. In this embodiment, they are so arranged that the valve element tends to open, when the valve is closed, so as to obtain a smooth movement of the valve element at the starting of the opening movement of the valve. This arrangement makes easy to design the arrangement of the chamber into the solenoid valve.

A connector 10 for supplying electric power to the coil 5 has a hole 9, into which an external socket (not shown) shall be inserted. A first channel 11 disposed in the housing 1 communicates with the input port 3, and a second channel 12 disposed also in the housing 1 communicates with the output port 2.

The core 7 has a coaxial pin 13, which is disposed so that a part thereof projects from one end of the core. The pin 13 is inserted into a plunger 14. A valve element 15 is disposed at one end of the plunger 14. A spring 16 is disposed between the core 7 and plunger 14. The spring is installed at a pushed state so as to urge the valve element 15 towards the housing 1 to close the communicating portion between the first and second channels 11, 12. A plate spring 17 is disposed on the plunger 14, which has a sealing element 18 at its peripheral portion. The solenoid valve has a seat 19, for fixing the solenoid valve to an external apparatus (not shown), by means of a fixing bolt 20. A chamber 21 is disposed in the housing 1 at a position between the input port 3 and the valve element 15, which opens and closes the fluid path. A cover 22 contours a face of the chamber 21, and is ultrasonic welded to the housing 1.

The function of the solenoid valve of the first embodiment is explained below. When electric power is not supplied to the coil 5 from the external power supply (not shown), the valve element 15 of the plunger 14 is urged by the resilient force of the spring 16 towards a face of the housing 1, to close the communicating portion between the first and second channels 11, 12. Thus the communication between these channels is closed.

Figure 2:
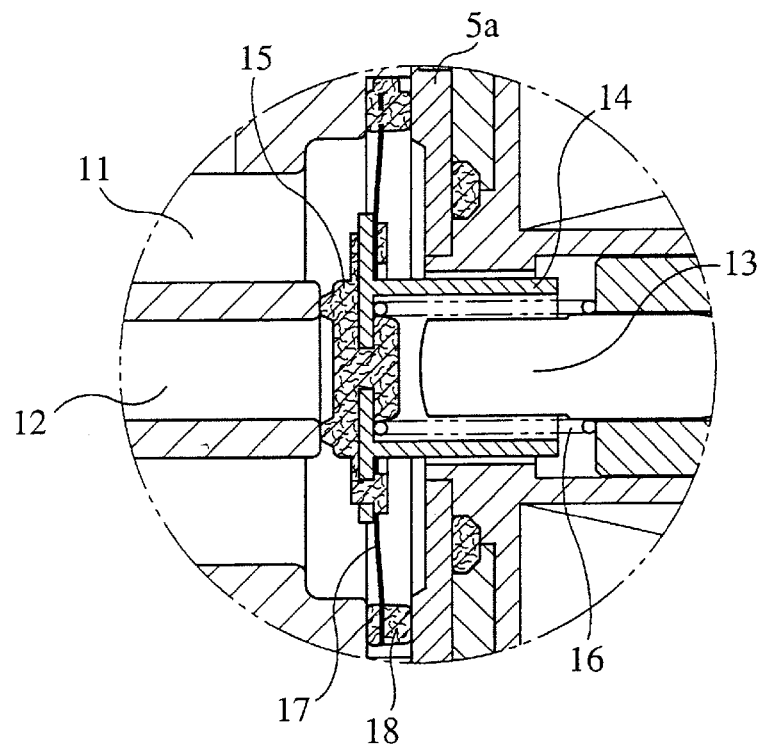
FIG. 2 shows a detailed cross sectional view of valve element of the solenoid valve according to the present invention at its opening state.
Figure 3:
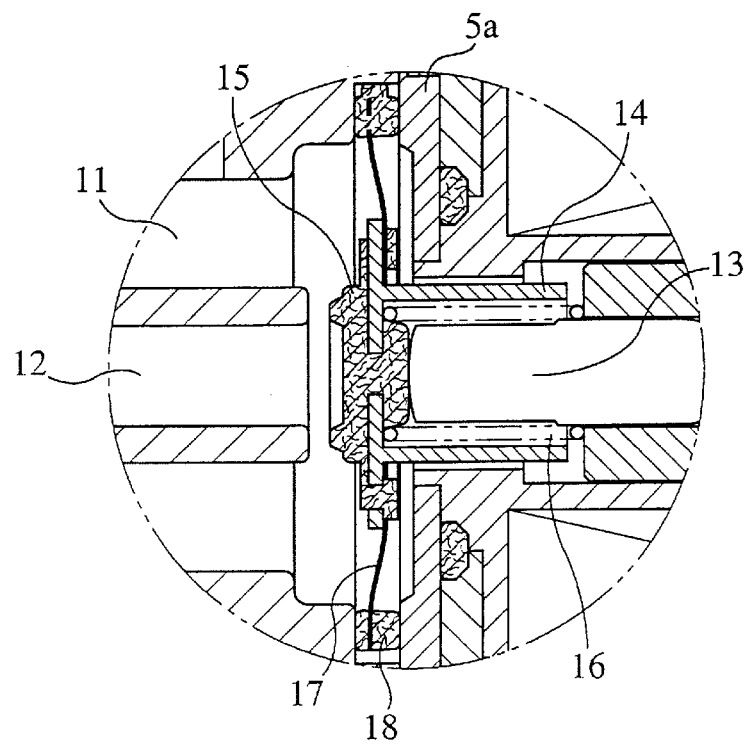
FIG. 3 shows a detailed cross sectional view of valve element of the solenoid valve according to the present invention at its closing state.

When electric power is supplied to the coil from the external power supply through a connector pin 10a, the coil induces a magnetic field to form a magnetic path passing through the plate 5a, core 7, yoke 8, and plunger 14. A magnetic force is generated between the core 7 and the plunger 14 to attract to each other. Therefore, the plunger 14 moves from the position shown in FIG. 2 to the position shown in FIG. 3, resisting the resilient force of the spring 16. As a result, the valve element 15 separates from the face of the housing 1 to open the communicating portion between the first and second channels 11, 12. Then, fluid supplied through the input port 3 is sucked by a negative pressure to flow into the output port 2, after passing through the first and second channels 11, 12.

According to the first embodiment, a chamber 21 is installed in the housing 1 at a position near to the input port 3. This means that the chamber 21 is positioned at a antinode of the vibration of sound emitted from the input port 3. As a result, a sound emission reducing effect can be attained, irrespective of the length of the piping. Because the chamber is incorporated in the solenoid valve, it is not necessary to install separately a chamber in the middle of the piping, as was in the prior art. Thus the mounting is not inconvenient, and, it is advantageous in the layout designing and fabrication cost. Additionally, the number of elements for fabrication can be decreased, thus the efficiency of production can be improved.

Embodiment 2

Figure 4:
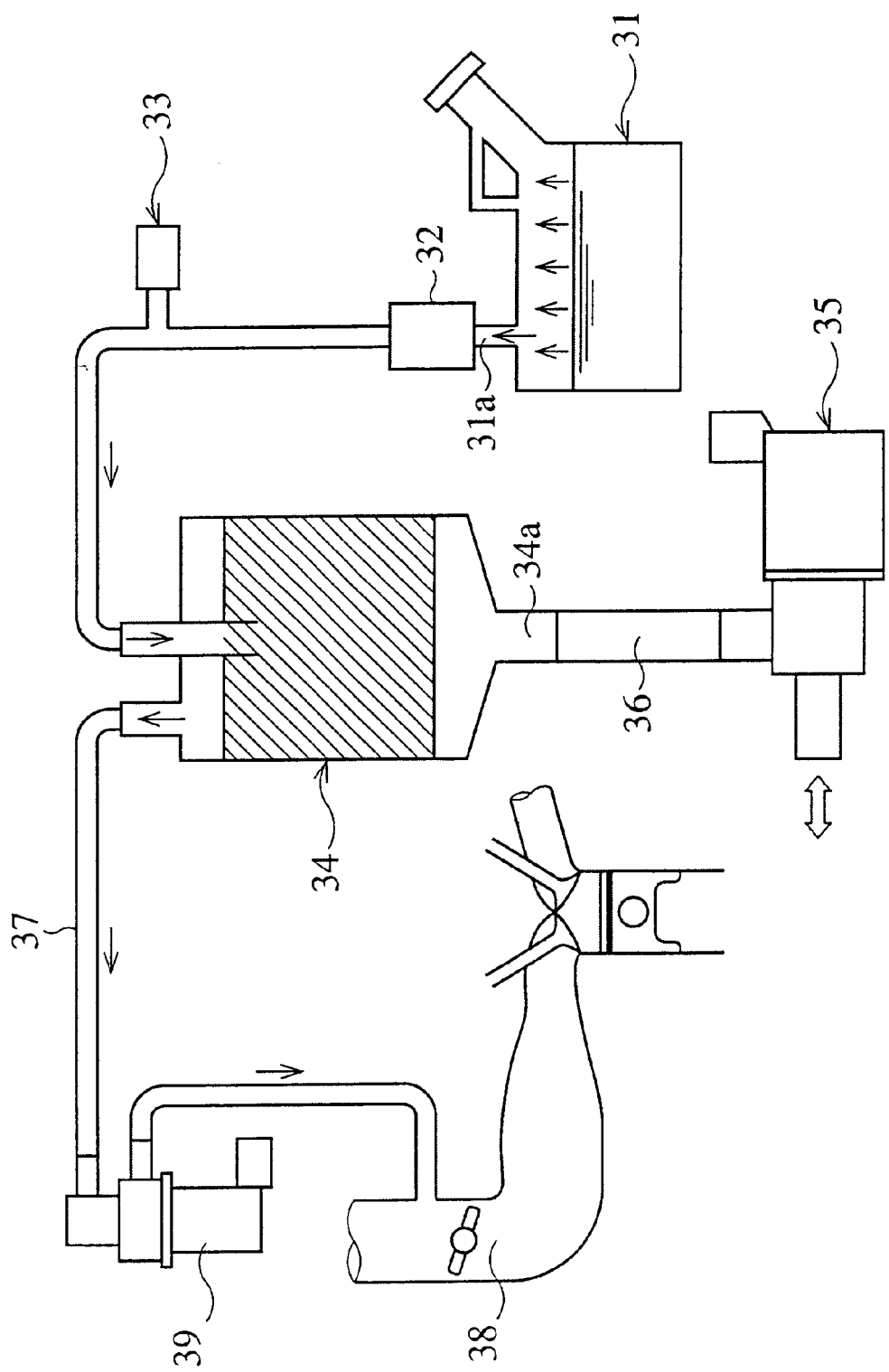
FIG. 4 shows a block diagram of an apparatus for suppressing the purge of the evaporated fuel gas, using a solenoid valve of the present invention.

FIG. 4 shows a block diagram of an apparatus for suppressing the purge of the evaporated fuel gas, using a solenoid valve of the first embodiment. Reference numeral 31 is a fuel tank, 32 is a separator arranged in the middle of a channel 31a, 33 is a pressure sensor. The pressure sensor detects the pressure change caused by a leakage of fuel, while the automobile is running, to carry out a diagnosis of the accident.

Reference numeral 34 denotes a canister, to which an end of the channel 31a is connected. An air cut valve 35 is connected to an atmosphere intaking opening 34a through an air hose 36. A channel 37 connects a flow out opening of the canister 34 to an intake pipe 38. A purge valve 39 is installed in the middle of the channel 37. In this embodiment, the solenoid valve of the first embodiment is used as the purge valve 39.

The function of the second embodiment is explained below.

Fuel purge gas, which is a gas evaporated from the fuel in the fuel tank, passes the channel 31a and is separated to a liquid component and a gas component at the separator 32. The liquid component returns to the fuel tank through the channel 31a, and the gas component is sent to the canister 34, due to a pressure difference.

The purge gas sent into the canister 34 is adsorbed temporarily by activated carbon in the canister 34. When a predetermined condition of operation is satisfied, the purge gas temporarily stored in the canister is sent to the intake pipe 38 of the engine, after passing through the canister purge valve 39. The canister purge valve 39 receives a control signal from a controller (not shown) so as to open and close the channel 37 so that the quantity of the purge gas to be sent to the intake pipe 38 is controlled.

In the prior art, the opening and closing movement of the canister purge valve 39 causes a pulsation of the purge gas from the canister 34 to the canister purge valve 39. This pulsation propagates back to the canister 34 to generate a resonance sound in the canister 34. According to the second embodiment, the solenoid valve of the first embodiment is used. In this case, the pulsation caused by the opening and closing of the canister purge valve 39 is decreased by the chamber 21, because the chamber 21 is positioned at an antinode of the vibration. Therefore, the pulsation propagating back to the canister 34 is small, and also the resonance sound due to the pulsation is small.

Figure 5:
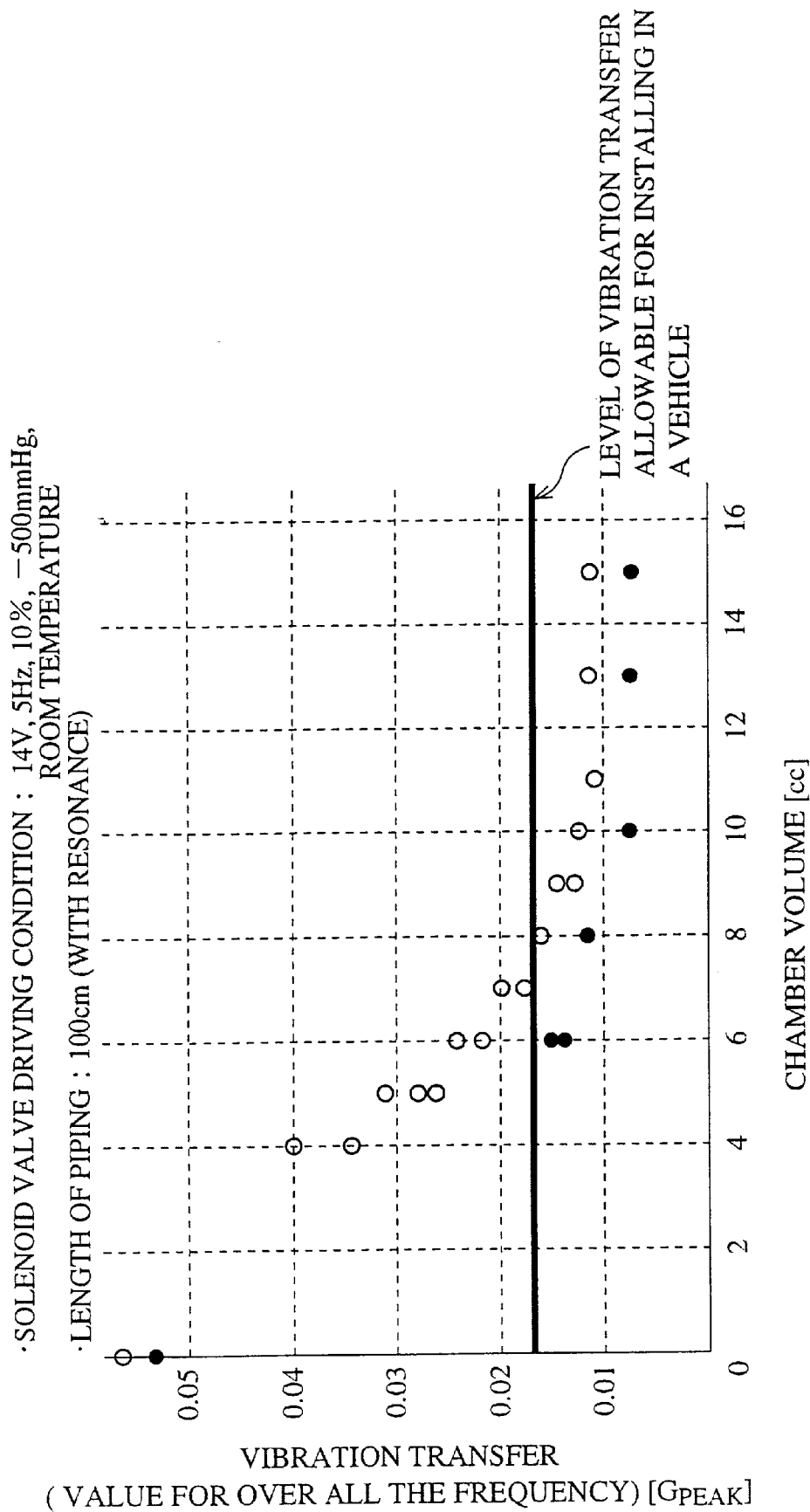
FIG. 5 shows a characteristic of vibration transfer versus chamber volume.
Figure 6:
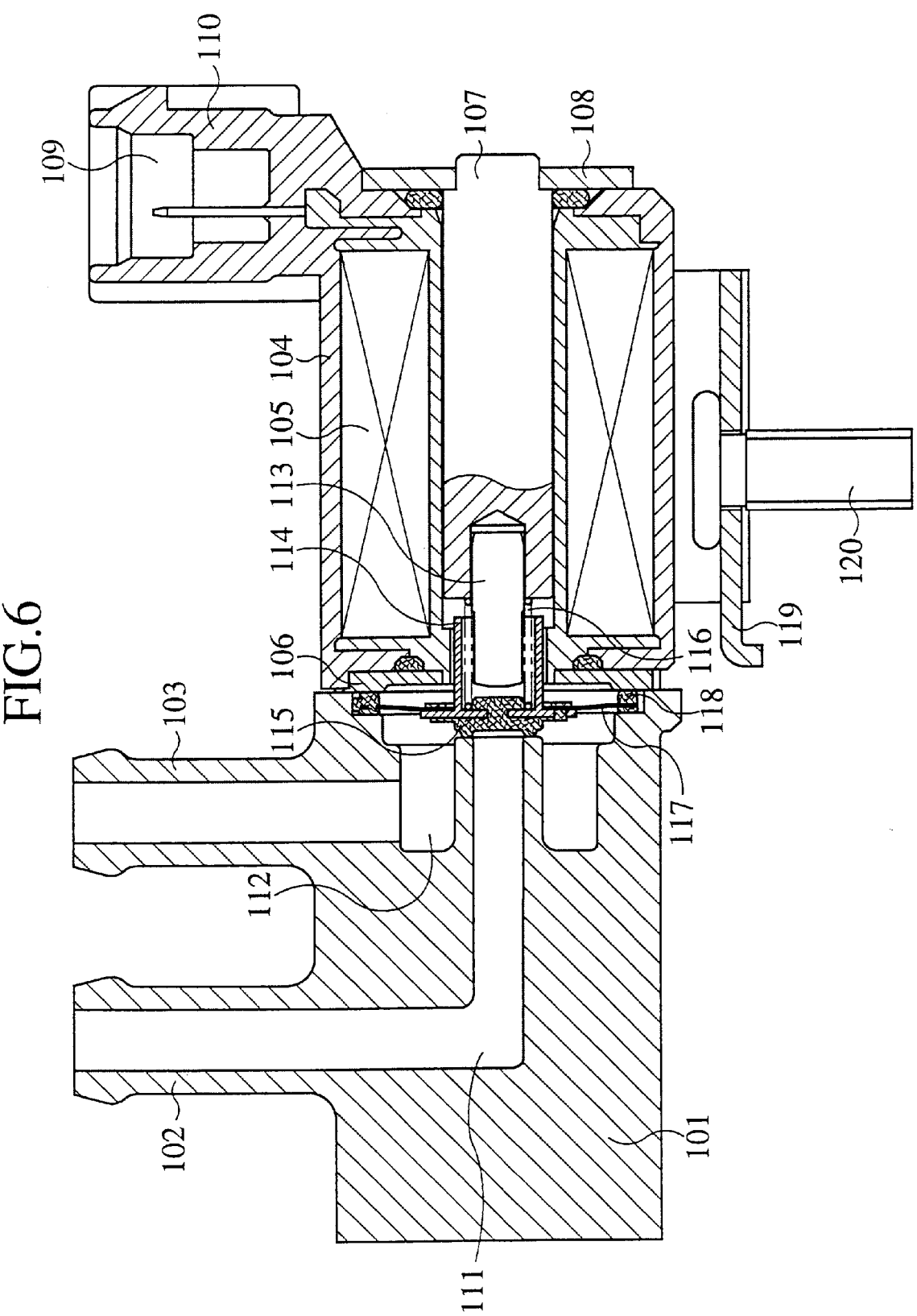
FIG. 6 shows a cross sectional view of the solenoid valve in the prior art.
Figure 9A:
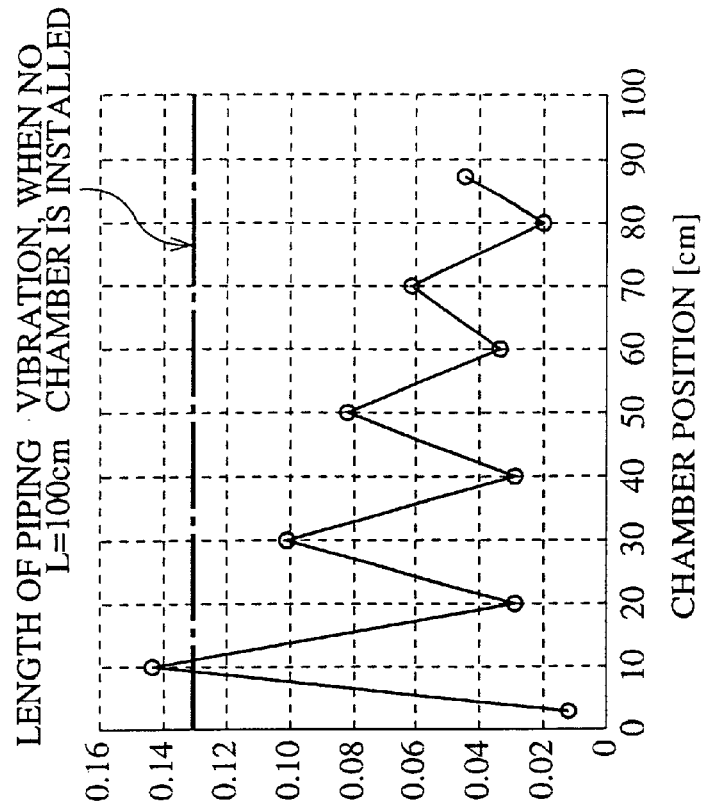
FIG. 9 shows a characteristic curve of resonating vibration of the canister versus the position of the chamber. FIG. (a) corresponds to the case that there is no resonance, (b) corresponds to the case that there is a resonance.
Figure 9B:
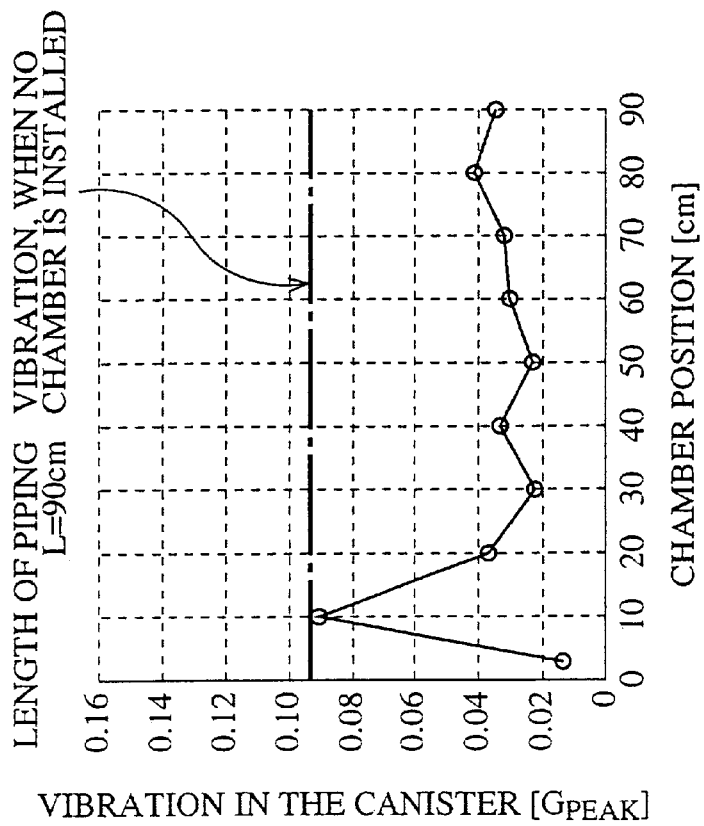

FIG. 5 shows a characteristic of vibration transfer versus chamber volume. White circles are data of the prior art, using a chamber installed in the middle of the piping. Black circles are data of the second embodiment, using a solenoid valve having a chamber incorporated in the housing thereof. These characteristics show that the vibration transfer can be reduced, when the solenoid valve of the present invention is used as a canister purge valve 39. As a result, also the resonance sound in the canister 34 due to the vibration transfer decreases, compared with the prior art.

According to the second embodiment, a solenoid valve having a chamber 31 in the housing 1 at a position near to the input port 3 is used as a canister purge valve, therefore, a pulsation caused by the opening and the closing of the channel can be decreased by the chamber 21. As a result, the emission of the pulsation to the piping is small, so that even when he pulsation propagates to the canister 34 and resonates with the eigenfrequency of the canister 34, no large resonance sound is generated.

As explained, the solenoid valve according to the present invention has a chamber in the housing at a position in the middle of the channel from the input port to the output port. This means that the chamber is positioned at an antinode of the pulsation to be caused by the opening and closing of the channel by the plunger. Therefore, a pulsation reduction effect can be automatically and surely obtained. As a result, it is possible to reduce the level of the resonance sound, which may appear in the prior art when the pulsation propagates back to the external apparatus and resonates with the eigenfrequency of the external apparatus. Additionally, the chamber is incorporated in the solenoid valve, thus it is not necessary to install separately the chamber in the middle of the piping, as was in the prior art. Further, there is an advantage that the number of element parts for fabrication can be reduced, and the efficiency of the fabrication can be improved.

According to the present invention, a solenoid valve incorporating a chamber is used in an apparatus, which suppresses the purge of the evaporated fuel gas evaporated in the fuel tank, and controls the supply of the purge gas to the intake pipe. Therefore, even when a pulsation is caused by the opening and closing of the channel by the plunger, and propagates back to the canister to resonate in the eigenfrequency of the canister, the resonating sound generated therein is small. Because the pulsation propagated back to the canister is small. Consequently, it is possible to obtain an advantage to make calm the interior of a vehicle, using the apparatus for suppressing the purge of the evaporated fuel gas according to the present invention.

What is claimed is:

1. A solenoid valve comprising:
   an output port, to which a pressure is imposed;
   an input port to be connected to an external apparatus;
   a plunger for opening and closing a channel communicating the input port and the output port, according to whether electric current is supplied or not to a coil for driving the plunger; and
   a chamber, between said input and output ports, and arranged at an antinode of sound vibrations emitted from said input port or by said opening and closing of said channel by said plunger.

2. A solenoid valve according to claim 1, wherein the plunger opens and closes a communicating portion between a first channel communicating with the input port and a second channel communicating with the output port.

3. A solenoid valve according to claim 2, wherein the solenoid valve comprises a valve element disposed between the communicating portion between the first and second channels, a spring always urging the valve element so as to close the communicating portion, a coil for driving the plunger to displace so as to open the communicating portion resisting against the resilient force of the spring, when electric current is provided.

4. A solenoid valve according to claim 1, wherein the pressure imposed to the output port is a negative pressure.

5. A solenoid valve according to claim 1, wherein the input port is connected to a canister for temporarily adsorbing evaporated fuel gas from a fuel tank, the output port is connected to an intake manifold of an engine, and functions as a canister purge valve of an apparatus for suppressing the purge of the evaporated fuel gas.

6. A solenoid valve according to claim 1, wherein the antinode of sound vibrations owing to said opening and closing of said channel by said plunger is at a portion in the middle of the channel from the input port to the output port.

7. An apparatus for suppressing the purge of evaporated fuel gas comprising:
   a canister for temporarily absorbing purge gas from a fuel tank;
   a solenoid valve for controlling a quantity of the purge gas to be supplied from the canister to an intake pipe, wherein the solenoid valve comprises:
      an output port, to which a pressure of an intake manifold is imposed;
      an input port to be connected to said canister;
      a plunger for opening and closing a channel communicating the input port and the output port, according to whether electric current is supplied to a coil for driving the plunger; and
      a chamber, between said input and output ports, and arranged at an antinode of sound vibrations emitted from said input port, or by said opening and closing of said channel by said plunger.

* * * * *